(12) United States Patent
Men

(10) Patent No.: US 6,503,027 B2
(45) Date of Patent: Jan. 7, 2003

(54) CUTTING TOOL ASSEMBLY

(75) Inventor: Yuri Men, Haifa (IL)

(73) Assignee: Iscar Ltd., Tefen (IL)

( * ) Notice: Subject to any disclaimer, the term of this patent is extended or adjusted under 35 U.S.C. 154(b) by 117 days.

(21) Appl. No.: 09/765,622

(22) Filed: Jan. 22, 2001

(65) Prior Publication Data

US 2001/0009636 A1 Jul. 26, 2001

(30) Foreign Application Priority Data

Jan. 26, 2000 (IL) .................................................. 134226

(51) Int. Cl.[7] .............................. B23C 5/00; B23C 5/12
(52) U.S. Cl. ........................................... 407/33; 407/46
(58) Field of Search ............................ 407/33, 31, 32, 407/30, 38, 40, 44, 46, 47, 48, 53, 73, 77, 87, 92, 93; 82/160; 409/234; 408/239

(56) References Cited

U.S. PATENT DOCUMENTS

| 4,850,759 | A | | 7/1989 | Strand et al. | |
|---|---|---|---|---|---|
| 4,958,965 | A | | 9/1990 | Strand et al. | |
| 5,143,495 | A | * | 9/1992 | Bosek | 408/239 R |
| 5,277,435 | A | * | 1/1994 | Kramer et al. | 279/156 |
| 5,403,134 | A | * | 4/1995 | Andersson et al. | 279/83 |
| 5,851,094 | A | * | 12/1998 | Strand et al. | 279/20 |
| 6,109,152 | A | * | 8/2000 | Hecht | 407/31 |
| 6,394,465 | B1 | * | 5/2002 | Guy | 279/76 |

FOREIGN PATENT DOCUMENTS

EP 0 298 937 10/1992

* cited by examiner

Primary Examiner—A. L. Wellington
Assistant Examiner—Brian Walsh
(74) Attorney, Agent, or Firm—Pennie & Edmonds LLP

(57) ABSTRACT

The present invention provides a cutting tool assembly comprising a tool shank a pull rod and a cutting head. The tool shank has an axially extending elongated hole. A forward portion of the elongated hole being formed by first and second non-coaxial, partially overlapping, axially extending cylindrical bores. The pull rod has forward coupling portion that cooperates with a rear-coupling portion of the cutting head, forming a joint coupling region. The pull rod and the rear-coupling portion of the cutting head are retained in the elongated hole in the tool shank with the joint coupling region situated in the forward portion of the elongated.

19 Claims, 4 Drawing Sheets

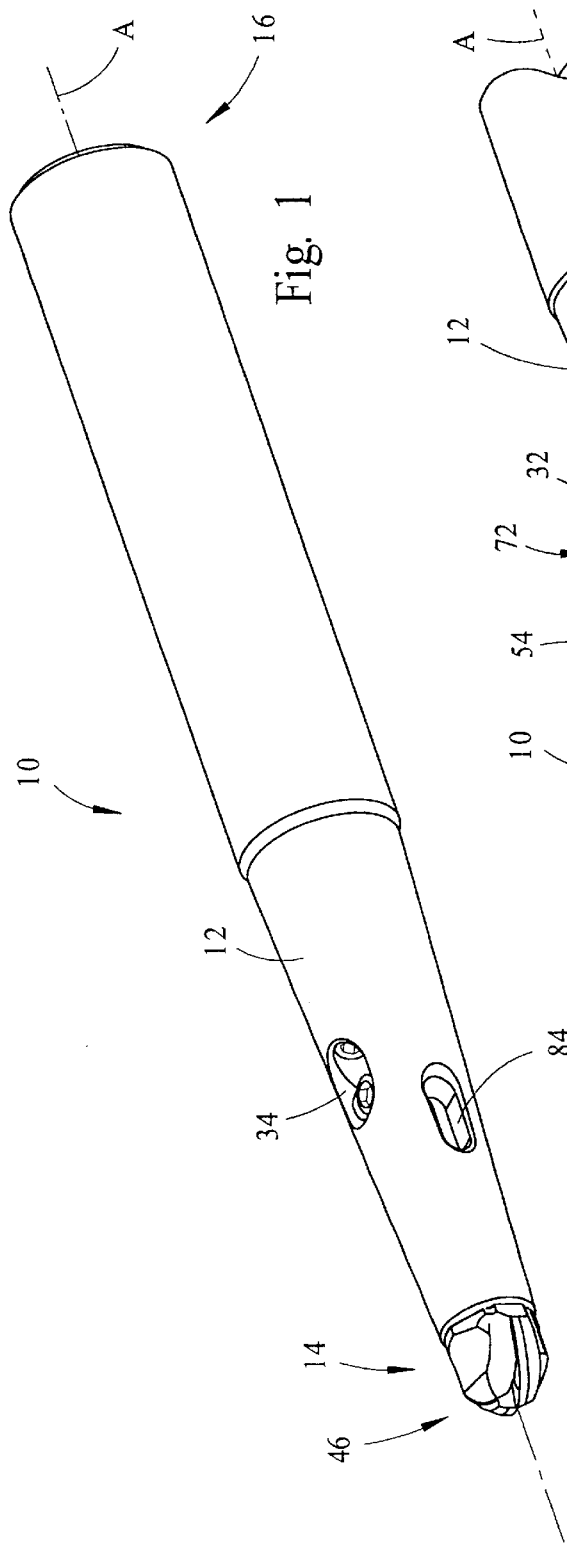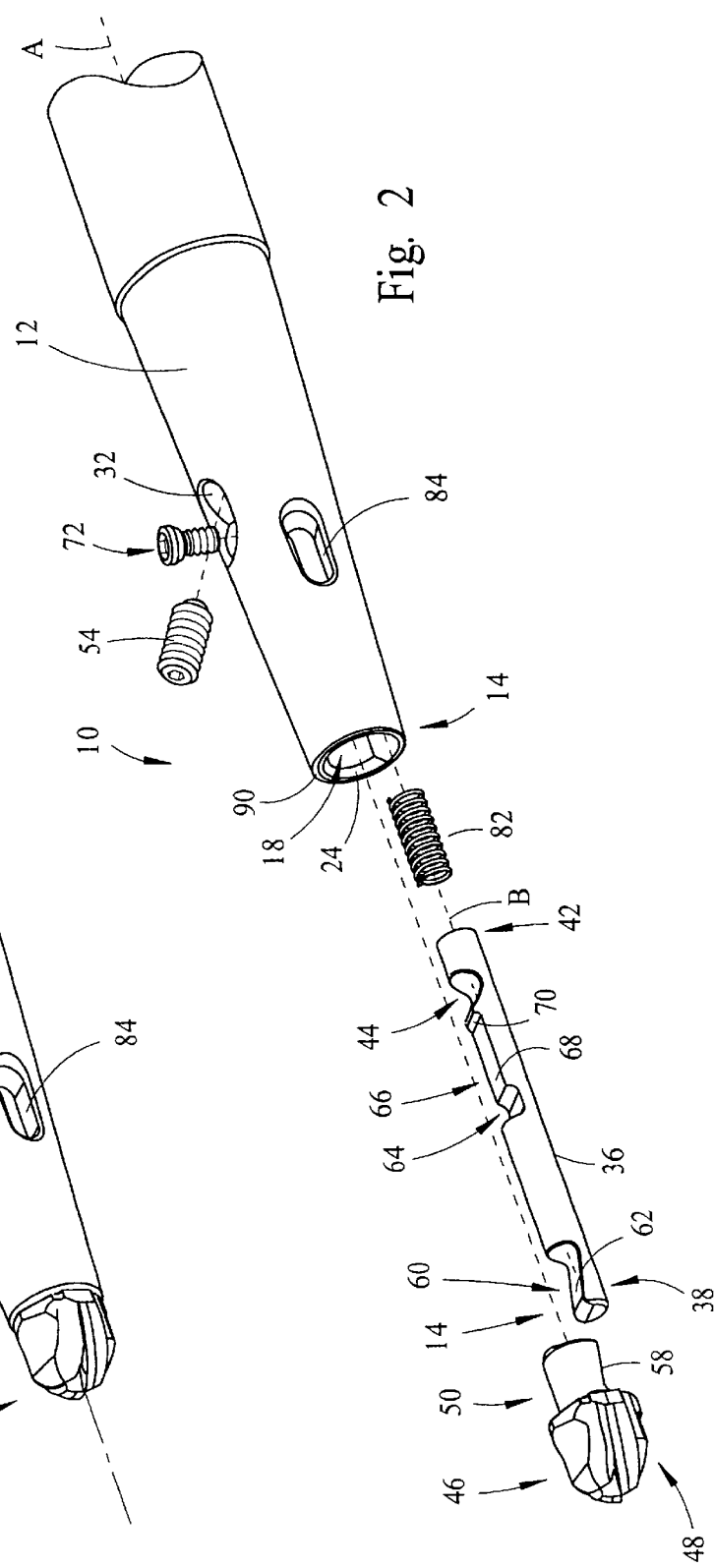

CUTTING TOOL ASSEMBLY

FIELD OF THE INVENTION

This invention relates generally to a cutting tool assembly having a replaceable cutting head, and more particularly to an elongated milling cutting tool assembly having a replaceable cutting head.

BACKGROUND OF THE INVENTION

Such cutting tool assemblies have long been known, particularly where the replaceable cutting head has a screw bore and is secured in position by means of a clamping screw. Removing the cutting head usually involves loosening and removal of the clamping screw. Mounting a new cutting head in position then requires holding the new cutting head in position whilst inserting the clamping screw in the screw bore and tightening the clamping screw.

With such known cutting tool assemblies, handling difficulties are often encountered when removing or mounting a cutting head, especially when the cutting head is small and the clamping screw is correspondingly small.

It has been proposed in EP 0 298 937 B1, to provide a cutting tool comprising a cutting body and a shaft that supports the cutting body. The cutting body is detachably connected to a locking screw via hook-shaped means. The hooked-shaped means transfers axial forces between the cutting body and the locking screw. Both the cutting body and the locking screw are provided with hook shaped means. Both of the hooked shaped means are provided with recesses and tongues. The recesses and tongues cooperate to permanently transfer rotational movement between the cutting body and the locking means. The locking screw is provided with an externally threaded portion that is connected to an internally threaded recess provided in the shaft. The threads are designed as right hand threads for right hand cutting tools and as left hand threads for left hand cutting tools. The locking screw is movable in the axial direction by relative rotation of the externally threaded portion and the internally threaded recess. The shaft is provided with a conical seat and the cutting body is provided with a circumferential conical portion that is received in the conical seat of the shaft. The cutting body can be inserted in or removed from the conical seat by displacing the locking screw from its innermost position to an intermediate position.

The prior art cutting tool described above suffers from two basic disadvantages. First, two cutting tools of the type described above have to be provided for two cutting directions. A right hand cutting tool with right hand threads and a left hand cutting tool with left hand threads. Second, it has been found that under certain working conditions the circumferential conical portion of the cutting body becomes lodged in the conical seat of the shaft and therefore after working it is difficult to remove the cutting body from the shaft.

It is an object of the present invention to provide a cutting tool assembly that substantially overcomes the above mentioned disadvantages.

SUMMARY OF THE INVENTION

In accordance with the present invention there is provided a cutting tool assembly comprising:

a tool shank having forward end and a rear end and a longitudinal axis passing through the forward and rear ends, an elongated hole having forward and rear ends and extending axially from an opening at the forward end of the tool shank, a forward portion of the elongated hole being formed by first and second non-coaxial, partially overlapping, axially extending cylindrical bores, a threaded securing screw bore extending from a point rearward of the forward end of the tool shank in a direction transverse to the longitudinal axis of the tool shank to the second cylindrical bore;

a pull rod, generally cylindrical in shape with a longitudinal axis, the pull rod having a forward end with a forward coupling portion and a rear end with a rear recess; and a cutting head having a forward cutting portion and a rear coupling portion cooperating with the forward coupling portion of the pull rod, the forward coupling portion of the pull rod and the rear coupling portion of the cutting head forming, when in cooperation, a joint coupling region, the pull rod and the rear coupling portion of the cutting head being retained in the elongated hole in the tool shank and secured therein by a securing screw, the securing screw being received in the threaded securing screw bore and engaging the rear recess in the rear end of the pull rod, the forward portion of the elongated hole and the joint coupling region having substantially the same cross sectional forms.

In accordance with a preferred embodiment of the present invention, the rear coupling portion of the cutting head is generally cylindrical in shape having a longitudinal axis and a recess having a generally axially extending planar coupling surface transversely directed with respect to the longitudinal axis of the cutting head.

Further in accordance with a preferred embodiment of the present invention, the forward coupling portion of the pull rod has a forward recess with a generally axially extending planar coupling surface transversely directed with respect to the longitudinal axis of the pull rod.

In accordance with the present invention, the coupling surface of the cutting head abuts the coupling surface of the pull rod.

In accordance with a preferred embodiment, the pull rod is provided with an intermediate recess between the forward recess and the rear recess.

Further in accordance with a preferred embodiment, an elongated indentation is formed in the pull rod, the elongated indentation extending between the intermediate and rear recesses in the pull rod, the elongated recess having a substantially planar guide surface.

Yet further in accordance with a preferred embodiment, the tool shank is provided with a second threaded bore and a guide screw, the second threaded bore being substantially perpendicular to the longitudinal axis of the tool shank and extending to the second cylindrical bore, the second threaded bore capable of receiving the guide screw, the guide screw having a threaded portion and a screw head and a front end axially remote from the screw head, the second threaded bore being adjacent the threaded securing screw bore, the arrangement being that in an assembled cutting tool assembly, the screw head of the guide screw is adjacent to but not in contact with a rear end of the securing screw and the front end of the guide screw is adjacent to but not in contact with the guide surface.

Preferably, the threaded securing screw bore and the second threaded bore open out to a joint aperture in the tool shank.

Preferably, the cutting tool assembly is provided with a spring located between the rear end of the pull rod and the rear end of the elongated hole.

If desired the tool shank is provided with a side aperture enabling contact to be made with the pull bar through the side aperture.

There is also provided in accordance with the present invention, a method for assembling a cutting tool assembly comprising an initial assembling procedure followed by a final assembling procedure;

the initial assembling procedure comprising the steps of:
(a1) providing a tool shank having forward end and a rear end and a longitudinal axis passing through the forward and rear ends, an elongated hole having forward and rear ends and extending axially from an opening at the forward end of the tool shank, a forward portion of the elongated hole being formed by first and second non-coaxial, partially overlapping, axially extending cylindrical bores, a threaded securing screw bore extending from a point rearward of the forward end of the tool shank in a direction transverse to the longitudinal axis of the tool shank to the second cylindrical bore and a second threaded bore adjacent the threaded securing screw bore, the second threaded bore being substantially perpendicular to the longitudinal axis of the tool shank, the threaded securing screw bore and the second threaded bore opening out to a joint aperture in the tool shank;
(b1) providing a pull rod, generally cylindrical in shape with a longitudinal axis, having a forward end with a forward coupling portion and a rear end with a rear recess, the forward coupling portion of the pull rod having a forward recess with a generally axially extending planar coupling surface transversely directed with respect to the longitudinal axis of the pull rod, an intermediate recess between the forward recess and the rear recess, an elongated indentation extending between the intermediate and rear recesses, the elongated indentation having a substantially planar guide surface.
(c1) providing a cutting head having a forward cutting portion and a rear coupling portion, the rear coupling portion being generally cylindrical in shape and having a longitudinal axis and a recess having a generally axially extending planar coupling surface transversely directed with respect to the longitudinal axis.
(d1) inserting a spring in the elongated hole;
(e1) inserting the pull rod into the elongated hole, with the guide surface horizontal and facing towards the second threaded bore, until the rear end of the pull rod engages the spring;
(f1) inserting the securing screw partially into the threaded securing screw bore; and
(g1) inserting and completely tightening the guide screw in the second threaded bore;

the final assembling procedure comprising the steps of:
(a2) positioning the cutting head adjacent the front end of the pull rod so that the rear coupling portion of the cutting head cooperates with the forward coupling portion of the pull rod, with the coupling surface of the cutting head abutting the coupling surface of the pull rod, the forward coupling portion of the pull rod and the rear coupling portion of the cutting head forming a joint coupling region;
(b2) urging the pull rod rearwardly into the elongated hole, whilst maintaining the rear coupling portion of the cutting head in cooperation with the forward coupling portion of the pull rod, until the rear recess of the pull rod is adjacent the threaded securing screw bore; and
(c2) screwing the securing screw into the threaded securing screw bore so that a forward portion of the securing screw enters the rear recess of the pull rod and urges the pull rod axially rearwardly further into the elongated bore until the rear coupling portion of the cutting head is securely located in the first cylindrical bore, whereby the joint coupling region is retained in the forward portion of the elongated hole.

BRIEF DESCRIPTION OF THE DRAWINGS

For a better understanding the invention will now be described, by way of example only, with reference to the accompanying drawings in which:

FIG. 1 is a perspective view of a cutting tool assembly in accordance with a preferred embodiment of the present invention;

FIG. 2 is an exploded perspective view of the cutting tool assembly in FIG. 1;

DETAILED DESCRIPTION OF THE INVENTION

Figure 3:
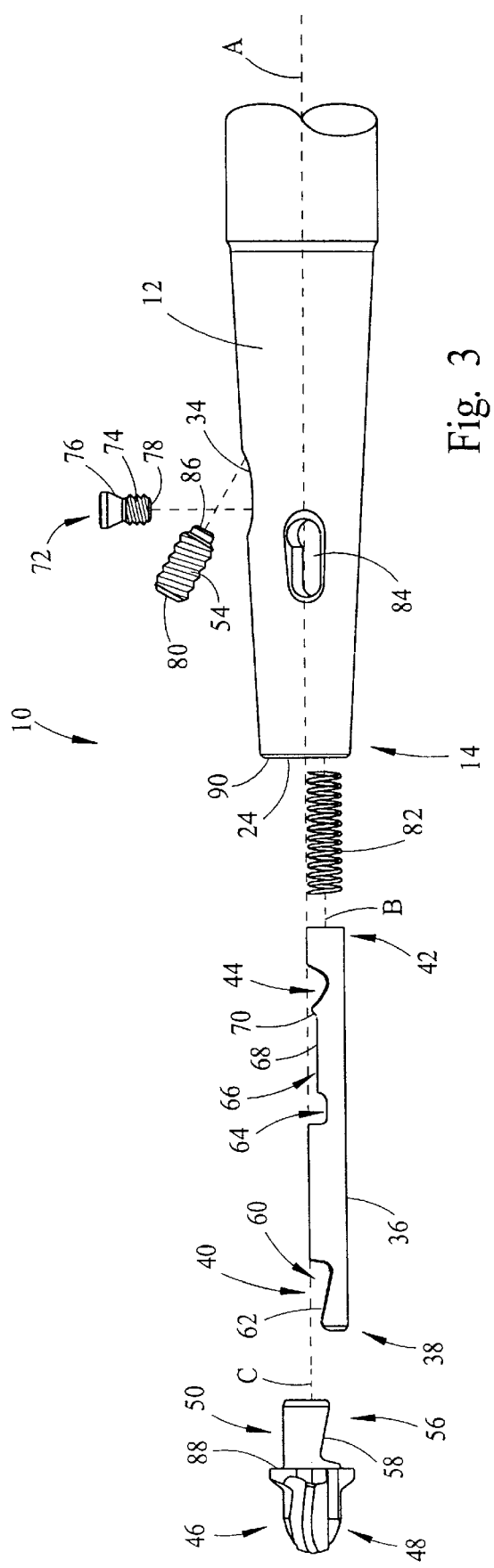
FIG. 3 is an exploded side view of the cutting tool assembly in FIG. 1.
Figure 4:
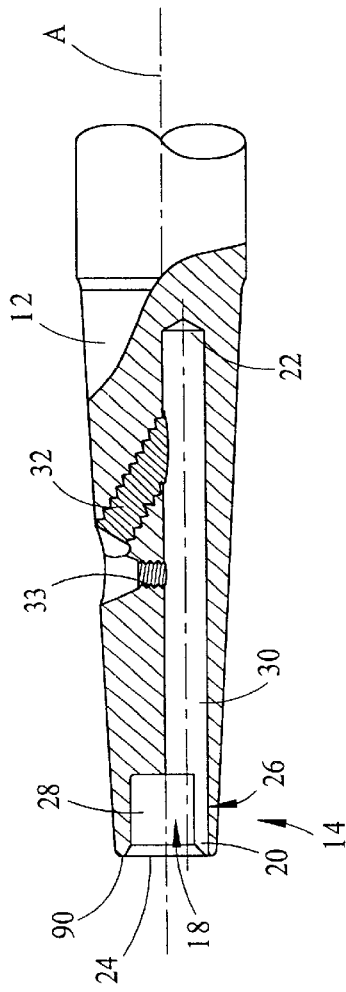
FIG. 4 is a partially sectioned side view of the tool shank of the cutting tool assembly in FIG. 1.

Attention is drawn to the drawings in general and to FIGS. 1 to 4 in particular, showing in accordance with the present invention, a cutting tool assembly 10 comprising a tool shank 12 having a forward end 14 and a rear end 16 and a longitudinal axis A passing through the forward and rear ends. An elongated hole 18 having forward 20 and rear 22 ends extends axially from an opening 24 at the forward end of the tool shank. A forward portion 26 of the elongated hole being formed by the union of first 28 and second 30 non-coaxial, partially overlapping, axially extending cylindrical bores. In accordance with a preferred embodiment of the present invention, the diameter of the first cylindrical bore is greater than the diameter of the second cylindrical bore. A threaded securing screw bore 32 extends from an aperture 34 in the side of the tool shank, at a point rearward of the forward end of the tool shank, in a direction transverse to the longitudinal axis A of the tool shank to the second cylindrical bore 30. A second threaded bore 33 adjacent the threaded securing screw bore also extends from aperture 34, in a direction perpendicular to the longitudinal axis A of the tool shank to the second cylindrical bore. The cutting tool assembly further comprises a pull rod 36 generally cylindrical in shape with a longitudinal axis B. The pull rod 36 has a forward end 38 with a forward coupling portion 40 and a rear end 42 with a rear recess 44.

Figure 8:
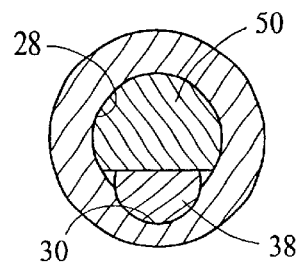
FIG. 8 is a cross sectional view of the joint coupling region of the pull rod and the cutting head.

For mounting on the tool shank there is provided a cutting head 46 having a forward cutting portion 48 and a rear-coupling portion 50 for cooperating with the forward coupling portion of the pull rod. The forward coupling portion of the pull rod and the rear coupling portion of the cutting head forming a joint coupling region 52 defined by the region of overlap between the two coupling portions when one cooperates with the other in the assembled cutting tool assembly or during assembly of the cutting tool assembly when positioning the cutting head on the pull rod (see FIGS. 5 and 6). In the assembled cutting tool assembly the pull rod and the rear coupling portion of the cutting head are both retained in the elongated hole 18 in the tool shank and secured therein by a securing screw 54. The securing screw 54 is received in the threaded securing screw bore 32 in the tool shank and in the assembled cutting tool assembly engages the rear recess 44 in the rear end of the pull rod. The forward end 20 of the elongated hole 18 and the joint coupling region 52 of the cutting head and the pull rod have substantially the same cross sectional forms (see FIG. 8). This structure, as seen in FIG. 8, enables rotational movement to be transferred from the tool shank to the cutting head. The forward end 38 of the pull rod acts as a key in a keyway (the part of the forward end 20 of the elongated hole coinciding with the second cylindrical bore 30) which is coupled to the rear coupling portion 50 of the cutting head.

Figure 9A:
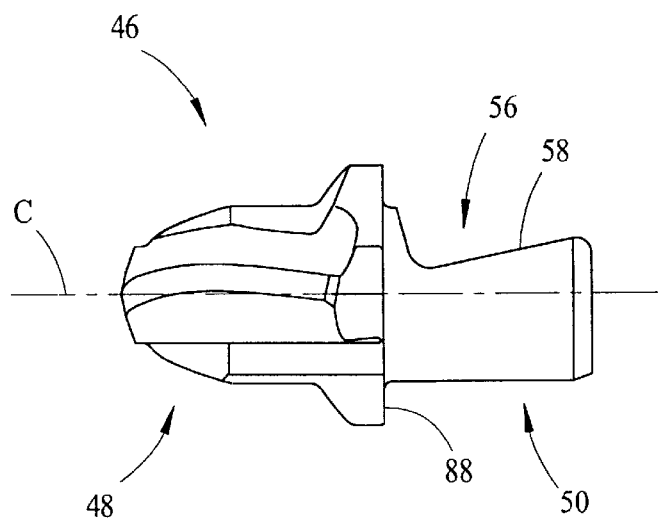
FIG. 9a is a side view of the cutting head in FIG. 1.
Figure 9B:
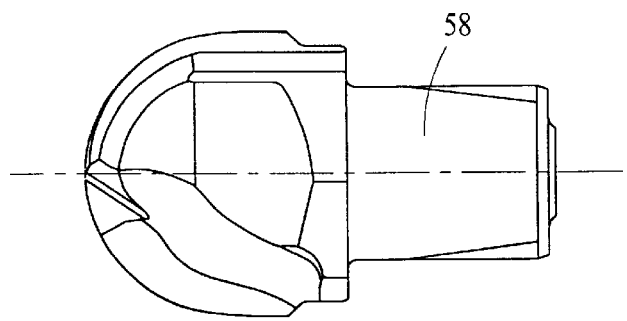
FIG. 9b is a top view of the cutting head in FIG. 1.
Figure 9C:
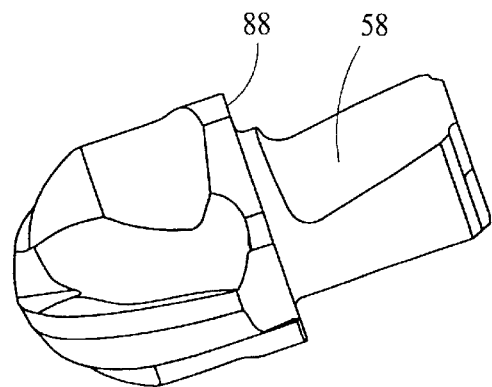
FIG. 9c is a top perspective view of the cutting head in FIG. 1.

Attention is now drawn to FIGS. 9a, 9b and 9c showing the cutting head 46 in accordance with a preferred embodiment of the present invention. The rear coupling portion 50 of the cutting head 46 is generally cylindrical in shape having a longitudinal axis C and a recess 56 having a generally axially extending planar coupling surface 58 transversely directed with respect to the longitudinal axis C of the cutting head.

The forward coupling portion 40 of the pull rod 36 has a forward recess 60 with a generally axially extending planar coupling surface 62 transversely directed with respect to the longitudinal axis B of the pull rod. In the assembled cutting tool assembly the coupling surface 58 of the cutting head 46 abuts the coupling surface 62 of the pull rod 36.

The pull rod 36 is provided with an intermediate recess 64 between the forward recess 60 and the rear recess 44. An elongated indentation 66 is formed in the pull rod. The elongated indentation extends between the intermediate 64 and rear 44 recesses and is provided with a substantially planar guide surface 68. The rear end of the elongated indentation 66 forms a back stop 70 on the pull rod. In addition to the securing screw 54 there is provided a guide screw 72. When the guide screw 72 is fully screwed into the second threaded bore 33 the back stop 70 cannot pass the guide screw in the forward direction, hence preventing removal of the pull rod from the tool shank. The guide screw has a threaded portion 74, a screw head 76 and a front end 78 axially remote from the screw head. As mentioned above, the second threaded bore 33 is adjacent the threaded securing screw bore 32. Hence, when assembling the cutting tool assembly, the screw head 76 of the guide screw 72 is capable of abutting a rear end 80 of the securing screw 54, thereby preventing the accidental removal of the securing screw 54 when changing a cutting head. It should be noted that the screw head 76 of the guide screw 72 prevents the securing screw 54 from accidentally being withdrawn from the threaded securing screw bore 32 (see FIGS. 5 and 6).

The cutting tool assembly is provided with a spring 82 located between the rear end 42 of the pull rod 36 and the rear end 22 of the elongated hole 18. As will be described below, the spring aids in the mounting and removal of a cutting head. The tool shank is provided with a side aperture 84 to aid in urging the pull rod axially forward when changing a cutting head.

The assembling of the cutting tool assembly is carried out in a two step method comprising an initial assembling procedure followed by a final assembling procedure. In the initial assembling procedure the pull rod is assembled in the tool shank and held in position by means of the guide screw 72 which prevents the pull rod from being completely withdrawn from the tool shank due to the presence of the back stop. The cutting head is mounted in the tool shank in the final assembling procedure. The cutting head is removed by performing the steps of the final assembling procedure in reverse order. Normally, the initial assembling procedure is carried out only once and the final assembling procedure (and the reverse final assembling procedure) is used for mounting (removing) cutting heads when required.

The initial assembling procedure comprising the steps of:
(i) inserting the spring 82 in the second cylindrical bore 30 of the elongated hole 18;
(ii) inserting the pull rod 36 into the second cylindrical bore 30 of the elongated hole 18, with the guide surface 68 horizontal and facing upwards, until the rear end 42 of the pull rod 36 engages the spring 82;
(iii) inserting the securing screw 54 partially into the threaded securing screw bore 32; and
(iv) inserting and screwing the guide screw 72 completely into the threaded bore 33.

Figure 5:
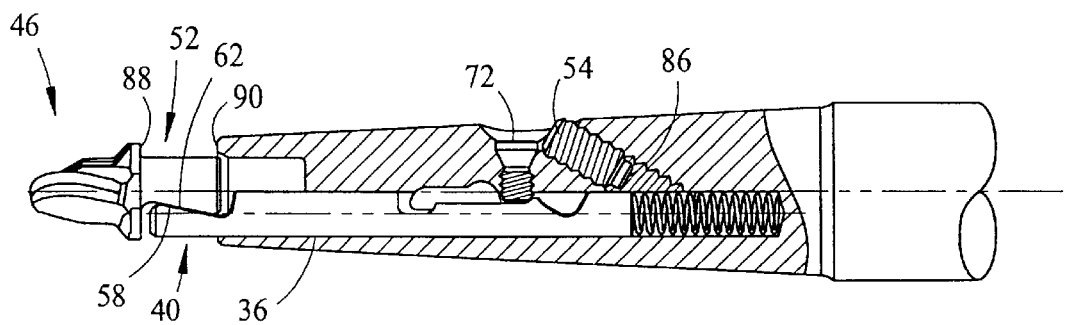
FIG. 5 is a partially sectioned side view of the cutting tool assembly in FIG. 1 in a initially assembled position.
Figure 6:
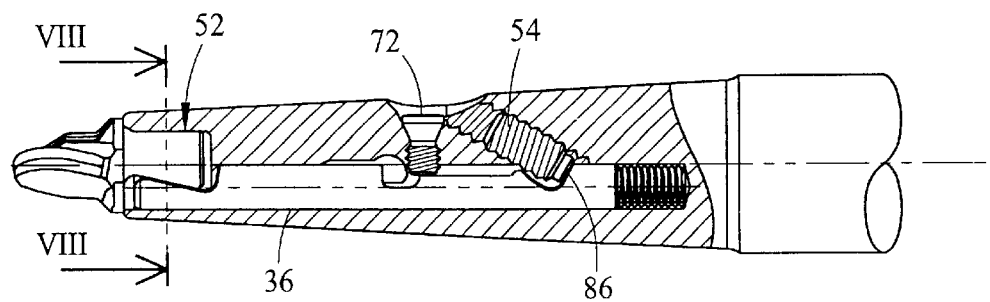
FIG. 6 is a partially sectioned side view of the cutting tool assembly in FIG. 1 in an finally assembled position.
Figure 7:
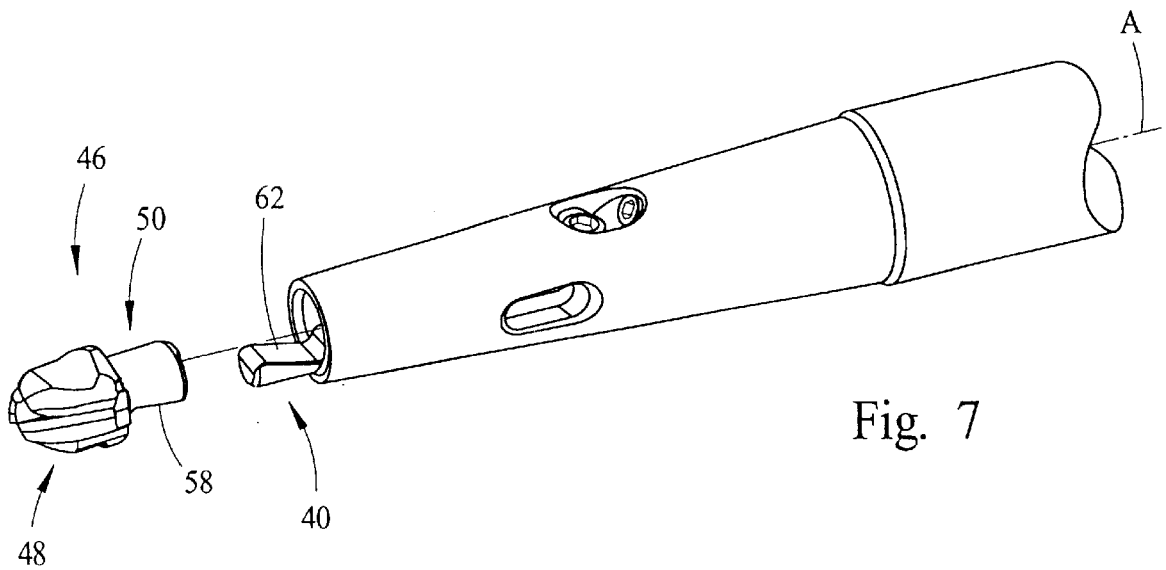
FIG. 7 is a perspective view of the of the cutting tool assembly in FIG. 1 showing the cutting insert and initially assembled tool shank.

The configuration of the cutting tool assembly will now be as shown in FIG. 5 (with the cutting head 46 removed) and FIG. 7. As can be seen, the forward coupling portion 40 projects from the forward end 14 of the tool shank sufficiently to be capable of receiving the cutting head. The back stop 70 is rearward of the guide screw 72.

The final assembling procedure comprises the additional steps of:
(v) positioning the cutting head 46 adjacent the front end 38 of the pull rod 36 so that the rear coupling portion 50 of the cutting head cooperates with the forward coupling portion 40 of the pull rod, with the coupling surface 58 of the cutting head 46 abutting the coupling surface 62;
(vi) urging the pull rod 36 rearwardly into the second cylindrical bore 30 of the elongated hole 18, whilst maintaining the rear coupling portion 50 of the cutting head 46 in cooperation with the forward coupling portion 40 of the pull rod 36, until the rear recess 44 of the pull rod is adjacent the threaded securing screw bore 32; and
(vii) screwing the securing screw 54 further into the threaded securing screw bore 32 so that a forward portion 86 of the securing screw 54 enters the rear recess 44 of the pull rod 36 and pushes the pull rod rearwardly further into the second cylindrical bore 30 of the elongated bore 18 until the rear coupling portion 50 of the cutting head 46 is securely located in the first cylindrical bore 28, whereby the joint coupling region 52 is located in the forward end 20 of the elongated hole 18. After completing steps (v) to (vii) the rearwardly facing rear surface 88 of the forward cutting portion 48 of the cutting head fully abuts the forwardly facing front surface 90 of the tool shank. By carrying out steps (v) to (vii) in the reverse order, and performing the reverse actions (like unscrewing instead of screwing) the cutting head can be removed from the tool shank whilst the pull rod remains retained in the tool shank. It should be noted that when mounting and removing a cutting head in accordance with the steps (v) to (vii) above, the pull rod is free to move axially between the two extreme positions shown in FIGS. 5 and 6. That is, the pull rod can move axially by an amount equal to the length of the guide surface 68. It should be further noted that in the fully screwed-in position the front end 78 of the guide screw 72 is adjacent to, but not in contact with, the guide surface. Apart from restraining the pull rod so that it cannot be fully removed from the tool shank when replacing a cutting head, the guide screw also prevents the pull rod from rotating relative to the tool shank when no cutting head is present.

Although the present invention has been described to a certain degree of particularity, it should be understood that various alterations and modifications can be made without departing from the spirit or scope of the invention as hereinafter claimed.

What is claimed is:

1. A cutting tool assembly comprising:
   a tool shank having a forward end and a rear end and a longitudinal axis passing through the forward and rear ends, an elongated hole having forward and rear ends and extending axially from an opening at the forward end of the tool shank, a forward portion of the elongated hole being formed by first and second non-coaxial, partially overlapping, axially extending cylindrical bores, a threaded securing screw bore extending from a point rearward of the forward end of the tool shank in a direction transverse to the longitudinal axis of the tool shank to the second cylindrical bore;
   a pull rod, generally cylindrical in shape with a longitudinal axis, the pull rod having a forward end with a forward coupling portion and a rear end with a rear recess; and
   a cutting head having a forward cutting portion and a rear coupling portion cooperating with the forward coupling portion of the pull rod, the forward coupling portion of the pull rod and the rear coupling portion of the cutting head forming, when in cooperation, a joint coupling region, the pull rod and the rear coupling portion of the cutting head being retained in the elongated hole in the tool shank and secured therein by a securing screw, the securing screw being received in the threaded securing screw bore and engaging the rear recess in the rear end of the pull rod, the forward portion of the elongated hole and the joint coupling region having substantially the same cross sectional forms.

2. The cutting tool assembly according to claim 1, wherein the rear coupling portion of the cutting head is generally cylindrical in shape having a longitudinal axis and a recess, the recess having a generally axially extending planar coupling surface transversely directed with respect to the longitudinal axis of the cutting head.

3. The cutting tool assembly according to claim 2, wherein the forward coupling portion of the pull rod has a forward recess with a generally axially extending planar coupling surface transversely directed with respect to the longitudinal axis of the pull rod.

4. The cutting tool assembly according to claim 3, wherein the coupling surface of the cutting head abuts the coupling surface of the pull rod.

5. The cutting tool assembly according to claim 4, wherein the pull rod is provided with an intermediate recess between the forward recess and the rear recess.

6. The cutting tool assembly according to claim 5, wherein an elongated indentation is formed in the pull rod, the elongated indentation extending between the intermediate and rear recesses in the pull rod, the elongated indentation having a substantially planar guide surface.

7. The cutting tool assembly according to claim 6, wherein the tool shank is provided with a second threaded bore and a guide screw, the second threaded bore being substantially perpendicular to the longitudinal axis of the tool shank and extending to the second cylindrical bore, the second threaded bore capable of receiving the guide screw, the guide screw having a threaded portion and a screw head and a front end axially remote from the screw head, the second threaded bore being adjacent the threaded securing screw bore, the arrangement being that in a assembled cutting tool assembly, the screw head of the guide screw adjacent to, but not in contact with, a rear end of the securing screw and the front end of the guide screw is adjacent to, but not in contact with, the guide surface.

8. The cutting tool assembly according to claim 7, wherein the threaded securing screw bore and the second threaded bore open out to a joint aperture in the tool shank.

9. The cutting tool assembly according to claim 8, wherein the cutting tool assembly is provided with a spring located between the rear end of the pull rod and the rear end of the elongated hole.

10. The cutting tool assembly according to claim 9, wherein the tool shank is provided with a side aperture enabling contact to be made with the pull rod through the side aperture.

11. A method for assembling a cutting tool assembly comprising an initial assembling procedure followed by a final assembling procedure;
    the initial assembling procedure comprising the steps of:
    (a1) providing a tool shank having a forward end and a rear end and a longitudinal axis passing through the forward and rear ends, an elongated hole having forward and rear ends and extending axially from an opening at the forward end of the tool shank, a forward portion of the elongated hole being formed by first and second non-coaxial, partially overlapping, axially extending cylindrical bores, a threaded securing screw bore extending from a point rearward of the forward end of the tool shank in a direction transverse to the longitudinal axis of the tool shank to the second cylindrical bore and a second threaded bore adjacent the threaded securing screw bore, the second threaded bore being substantially perpendicular to the longitudinal axis of the tool shank, the threaded securing screw bore and the second threaded bore opening out to a joint aperture in the tool shank;
    (b1) providing a pull rod, generally cylindrical in shape with a longitudinal axis, having a forward end with a forward coupling portion and a rear end with a rear recess, the forward coupling portion of the pull rod having a forward recess with a generally axially extending planar coupling surface transversely directed with respect to the longitudinal axis of the pull rod, an intermediate recess between the forward recess and the rear recess, an elongated indentation extending between the intermediate and rear recesses, the elongated indentation having a substantially planar guide surface;
    (c1) providing a cutting head having a forward cutting portion and a rear coupling portion, the rear coupling portion being generally cylindrical in shape and having a longitudinal axis and a recess having a generally axially extending planar coupling surface transversely directed with respect to the longitudinal axis;

(d1) inserting a spring in the second cylindrical bore of the elongated hole;

(e1) inserting the pull rod into the second cylindrical bore of the elongated hole, with the guide surface horizontal and facing towards the second threaded bore, until the rear end of the pull rod engages the spring;

(f1) inserting the securing screw partially into the threaded securing screw bore; and (g1) inserting and completely tightening the guide screw in the second threaded bore;

the final assembling procedure comprising the steps of:

(a2) positioning the cutting head adjacent the front end of the pull rod so that the rear coupling portion of the cutting head cooperates with the forward coupling portion of the pull rod, with the coupling surface of the cutting head abutting the coupling surface of the pull rod, the forward coupling portion of the pull rod and the rear coupling portion of the cutting head forming a joint coupling region;

(b2) urging the pull rod rearwardly into the second cylindrical bore of the elongated hole, whilst maintaining the rear coupling portion of the cutting head in cooperation with the forward coupling portion of the pull rod, until the rear recess of the pull rod is adjacent the threaded securing screw bore; and (c2) screwing the securing screw into the threaded securing screw bore so that a forward portion of the securing screw enters the rear recess of the pull rod and urges the pull rod axially rearwardly further into the second cylindrical bore of the elongated hole until the rear coupling portion of the cutting head is securely located in the first cylindrical bore, whereby the joint coupling region is retained in the forward portion of the elongated hole.

12. A cutting tool assembly comprising:

a tool shank having a forward end, a rear end, and an elongated hole having forward and rear ends and extending axially from an opening at the forward end of the tool shank, a forward portion of the elongated hole being formed by first and second non-coaxial partially overlapping bores, the second bore extending farther into the tool shank than the first bore, a first threaded bore extending from a point rearward of the first bore in a direction transverse to the longitudinal axis of the tool shank to the second cylindrical bore;

a pull rod having a forward end provided with a forward coupling portion and a rear end, the pull rod being provided with a first recess located between the pull rod's forward end and the pull rod's rear end;

a cutting head having a forward cutting portion and rear coupling portion, the rear coupling portion configured to cooperate with the forward coupling portion of the pull rod and form a joint coupling region in the forward portion of the elongated hole; and a securing screw received in the first threaded bore and engaging the first recess of the pull rod.

13. The cutting tool assembly according to claim 12, wherein the pull rod further comprises an elongated indentation extending from the first recess in a direction of the forward end of the pull rod.

14. The cutting tool assembly according to claim 13, wherein the pull rod further comprises a second recess located between the pull rod's forward end and the first recess.

15. The cutting tool assembly according to claim 14, wherein elongated indentation extends between the first and second recesses, the elongated indentation having a substantially planar guide surface.

16. The cutting tool assembly according to claim 15, wherein the tool shank is provided with a second threaded bore extending into the second cylindrical bore and a guide screw inserted into the second threaded bore, a screw head of the guide screw being positioned so as to prevent accidental removal of the securing screw.

17. The cutting tool assembly according to claim 12, wherein the tool shank is provided with a second threaded bore extending into the second cylindrical bore and a guide screw inserted into the second threaded bore, a screw head of the guide screw being positioned so as to prevent accidental removal of the securing screw.

18. The cutting tool assembly according to claim 12, wherein:

the rear coupling portion of the cutting head has a cylindrical shape of a first diameter in which is formed a recess provided with a generally axially extending first planar coupling surface transversely directed with respect to a longitudinal axis of the coupling head;

the forward coupling portion of the pull rod has a cylindrical shape of a second diameter in which is formed a recess provided with a generally axially extending second planar coupling surface transversely directed with respect to a longitudinal axis of the pull rod;

and wherein the first diameter is larger than the second diameter.

19. The cutting tool assembly according to claim 12, wherein the forward portion of the elongated hole, and the joint coupling region, have substantially the same cross sectional forms.

* * * * *